US012659968B2

(12) United States Patent
Papasakellariou

(10) Patent No.: US 12,659,968 B2
(45) Date of Patent: Jun. 16, 2026

(54) RECEPTION OF CONTROL SIGNALING IN PRESENCE OF INTERFERENCE

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 18/325,932

(22) Filed: May 30, 2023

(65) Prior Publication Data

US 2023/0403723 A1　　Dec. 14, 2023

Related U.S. Application Data

(60) Provisional application No. 63/350,223, filed on Jun. 8, 2022.

(51) Int. Cl.
| | |
|---|---|
| *H04W 72/232* | (2023.01) |
| *H04L 5/00* | (2006.01) |
| *H04W 72/51* | (2023.01) |
| *H04L 25/02* | (2006.01) |

(52) U.S. Cl.
CPC ......... *H04W 72/232* (2023.01); *H04L 5/0051* (2013.01); *H04W 72/51* (2023.01); *H04L 25/0224* (2013.01)

(58) Field of Classification Search
CPC ... H04W 72/232; H04W 72/51; H04W 16/14; H04L 5/0051; H04L 5/0224; H04L 5/0007; H04L 5/0053; H04L 5/0094; H04L 5/005

USPC .................................................. 370/329–330
See application file for complete search history.

(56) References Cited

U.S. PATENT DOCUMENTS

| | | |
|---|---|---|
| 2011/0116572 A1 | 5/2011 | Lee et al. |
| 2015/0016386 A1 | 1/2015 | Tamrakar et al. |
| 2015/0245322 A1* | 8/2015 | Shimezawa ........... H04W 72/23 |
| | | 370/329 |
| 2016/0270038 A1 | 9/2016 | Papasakellariou |
| 2017/0215186 A1* | 7/2017 | Chen ..................... H04L 5/0048 |

(Continued)

OTHER PUBLICATIONS

"3rd Generation Partnership Project; Technical Specification Group Radio Access Network; NR; Physical channels and modulation (Release 17)", 3GPP TS 38.211 V17.1.0, Mar. 2022, 135 pages.

(Continued)

*Primary Examiner* — Candal Elpenord

(57) ABSTRACT

Apparatuses and methods for reception of control signaling in the presence of interference. A method for receiving physical downlink control channels (PDCCHs) includes transmitting an indication for one of a first capability to receive PDCCHs over symbols only when at least one of the symbols does not include resource elements (REs) for a common reference signal (CRS) and a second capability to receive PDCCHs over symbols when any of the symbols include REs for the CRS. A PDCCH is according to a new radio (NR) radio access technology (RAT). The CRS is according to a long term evolution (LTE) RAT. The method further includes receiving first information for parameters of the CRS, determining, based on the parameters of the CRS, the REs for the CRS in symbols of the PDCCH, and receiving the PDCCH based on the REs for the CRS in symbols of the PDCCH.

20 Claims, 10 Drawing Sheets

(56) References Cited

U.S. PATENT DOCUMENTS

| | | | | |
|---|---|---|---|---|
| 2018/0212726 A1* | 7/2018 | Xue | ....................... | H04L 5/0092 |
| 2022/0070901 A1* | 3/2022 | Muruganathan | ...... | H04L 5/0051 |
| 2024/0008037 A1* | 1/2024 | Papasakellariou | .... | H04L 1/0072 |
| 2025/0015950 A1* | 1/2025 | Park | ........................ | H04L 5/005 |
| 2025/0158772 A1* | 5/2025 | Matsumura | ........... | H04L 5/0094 |
| 2025/0202636 A1* | 6/2025 | Guo | ...................... | H04L 5/0051 |

OTHER PUBLICATIONS

"3rd Generation Partnership Project; Technical Specification Group Radio Access Network; NR; Multiplexing and channel coding (Release 17)", 3GPP TS 38.212 V17.1.0, Mar. 2022, 197 pages.

"3rd Generation Partnership Project; Technical Specification Group Radio Access Network; NR; Physical layer procedures for control (Release 17)", 3GPP TS 38.213 V17.1.0, Mar. 2022, 245 pages.

"3rd Generation Partnership Project; Technical Specification Group Radio Access Network; NR; Physical layer procedures for data (Release 17)", 3GPP TS 38.214 V17.1.0, Mar. 2022, 225 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

"LTE; Evolved Universal Terrestrial Radio Access (E-UTRA); Physical channels and modulation (3GPP TS 36.211 version 17.1.0 Release 17)", ETSI TS 136 211 V17.1.0, May 2022, 252 pages.

International Search Report and Written Opinion issued Sep. 11, 2023 regarding International Application No. PCT/KR2023/007769, 7 pages.

NTT Docomo, Inc., "Discussion on NR PDCCH reception in symbols with LTE CRS REs", 3GPP TSG RAN WG1 #109-e, R1-2204395, Apr. 2022, 3 pages.

Apple Inc., "Discussion on NR PDCCH reception in symbols with LTE CRS REs", 3GPP TSG RAN WG1 #109-e, R1-2204260, Apr. 2022, 2 pages.

Extended European Search Report issued Jul. 18, 2025 regarding Application No. 23820091.9, 10 pages.

ZTE, "Discussion on NR PDCCH reception for DSS" 3GPP TSG RAN WG1 #109-e, R1-2203210, May 2022, 5 pages.

ZTE, "Discussion on PDCCH reception with two overlapping CRS patterns for DSS", 3GPP TSG RAN WG1 #109-e, R1-2204332, May 2022, 2 pages.

* cited by examiner

1000

1100

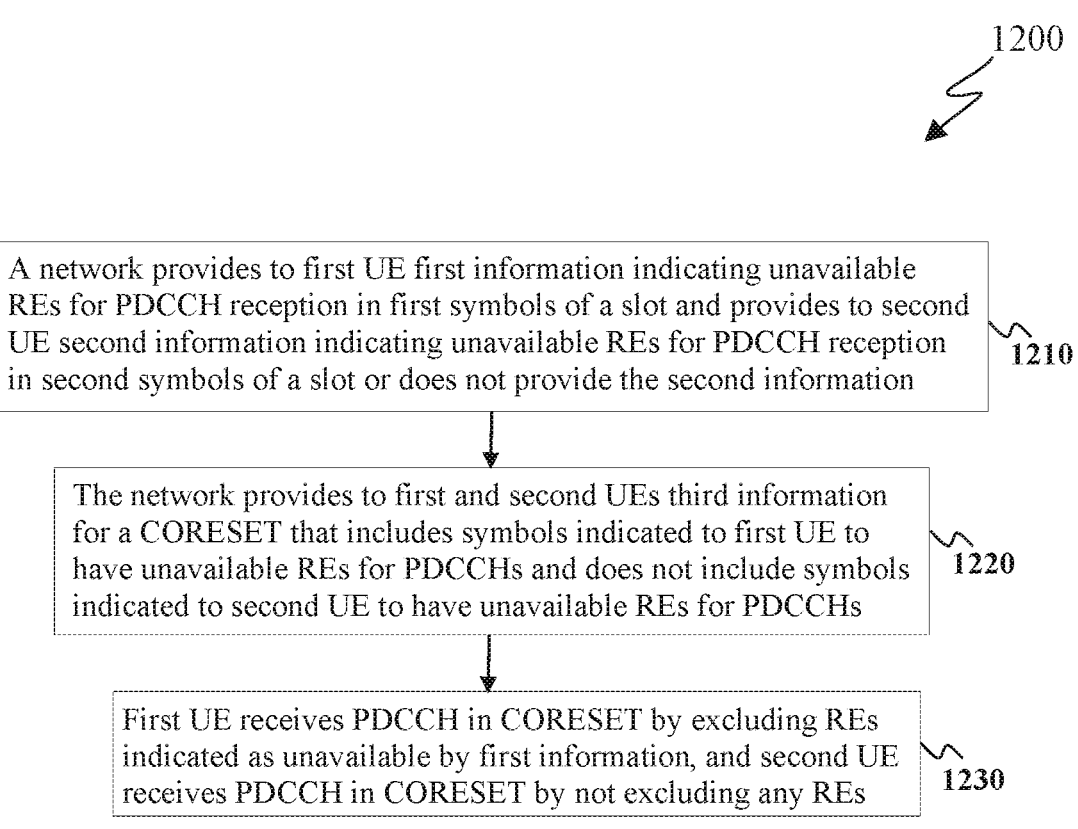

1200

A network provides to first UE first information indicating unavailable REs for PDCCH reception in first symbols of a slot and provides to second UE second information indicating unavailable REs for PDCCH reception in second symbols of a slot or does not provide the second information

1210

The network provides to first and second UEs third information for a CORESET that includes symbols indicated to first UE to have unavailable REs for PDCCHs and does not include symbols indicated to second UE to have unavailable REs for PDCCHs

1220

First UE receives PDCCH in CORESET by excluding REs indicated as unavailable by first information, and second UE receives PDCCH in CORESET by not excluding any REs

RECEPTION OF CONTROL SIGNALING IN PRESENCE OF INTERFERENCE

CROSS-REFERENCE TO RELATED APPLICATION AND CLAIM OF PRIORITY

This application claims priority under 35 U.S.C. § 119(e) to U.S. Provisional Patent Application No. 63/350,223 filed on Jun. 8, 2022. The above-identified provisional patent application is hereby incorporated by reference in its entirety.

TECHNICAL FIELD

The present disclosure relates generally to wireless communication systems and, more specifically, to reception of control signaling in the presence of interference.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for reception of control signaling in the presence of interference.

In one embodiment, a method for receiving physical downlink control channels (PDCCHs) is provided. The method includes transmitting an indication for one of a first capability to receive PDCCHs over symbols only when at least one of the symbols does not include resource elements (REs) for a common reference signal (CRS) and a second capability to receive PDCCHs over symbols when any of the symbols include REs for the CRS. A PDCCH is according to a NR RAT. The CRS is according to a long term evolution (LTE) RAT. The method further includes receiving first information for parameters of the CRS, determining, based on the parameters of the CRS, the REs for the CRS in symbols of the PDCCH, and receiving the PDCCH based on the REs for the CRS in symbols of the PDCCH.

In another embodiment, a user equipment (UE) is provided. The UE includes a transceiver configured to transmit an indication for one of a first capability to receive PDCCHs over symbols only when at least one of the symbols does not include REs for a CRS, and a second capability to receive PDCCHs over symbols when any of the symbols include REs for the CRS. A PDCCH is according to a NR RAT. The CRS is according to a LTE RAT. The transceiver is further configured to receive first information for parameters of the CRS. The UE further includes a processor operably coupled to the transceiver. The processor is configured to determine, based on the parameters of the CRS, the REs for the CRS in symbols of the PDCCH. The transceiver is further configured to receive the PDCCH based on the REs for the CRS in symbols of the PDCCH.

In yet another embodiment, a base station is provided. The base station includes a processor configured to determine a first number of antenna ports for a CRS and a transceiver operably coupled to the processor. The transceiver is configured to transmit first information indicating the first number of antenna ports for the CRS to a first UE and second information indicating a second number of antenna ports for the CRS to a second UE. The first number is larger than the second number. The CRS is according to a LTE RAT.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates an example method for a network to support, in a control resource set (CORESET) that includes a symbol with CRS transmission, PDCCH receptions by a first UE that supports puncturing PDCCH receptions in REs and PDCCH receptions by a second UE that does not support puncturing PDCCH receptions in REs according to embodiments of the present disclosure.

DETAILED DESCRIPTION

Figure 1:
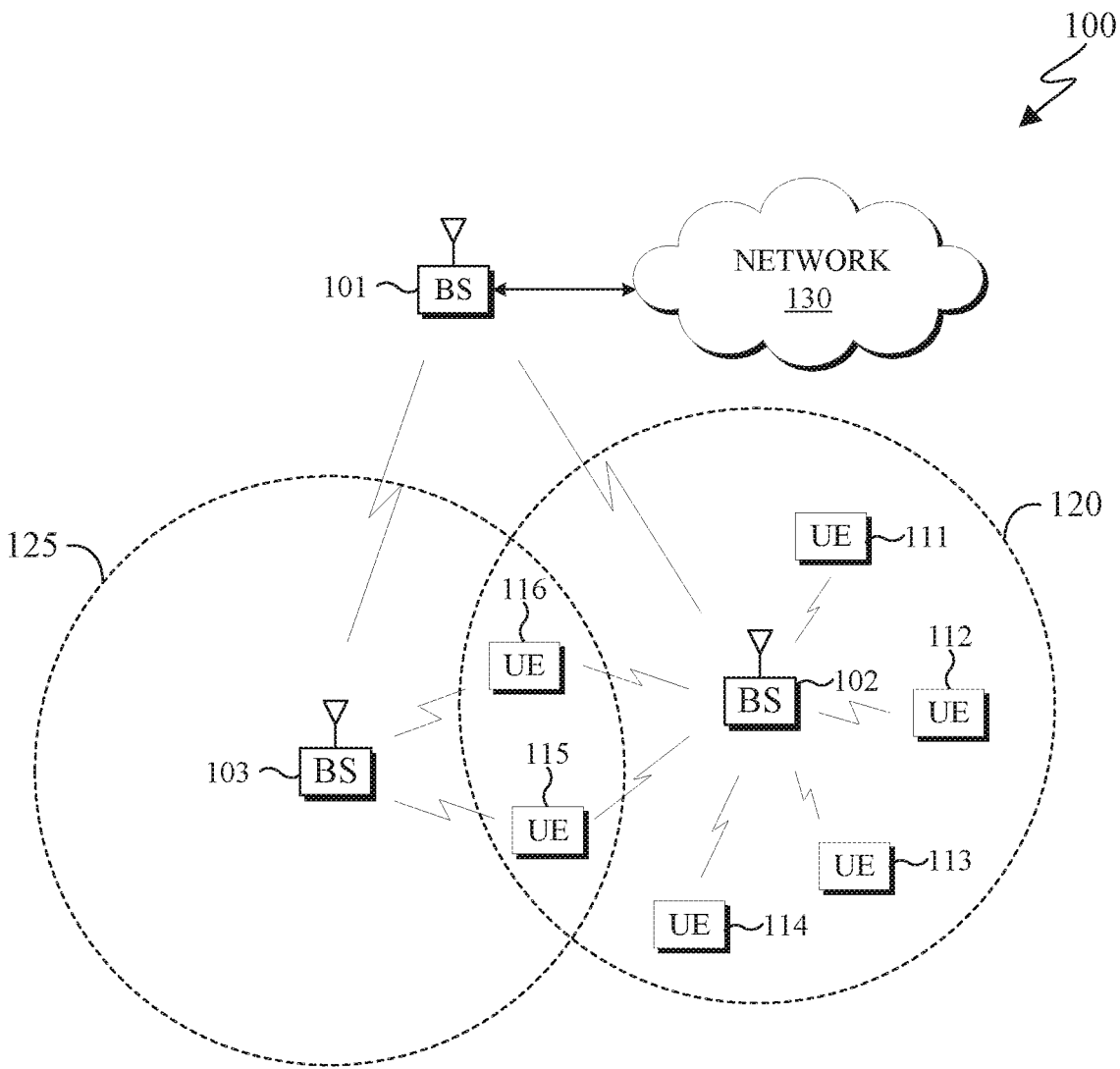
FIG. 1 illustrates an example wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.1.0, "NR; Physical channels and modulation;" 3GPP TS 38.212 v17.1.0, "E-UTRA, NR, Multiplexing and Channel coding"; 3GPP TS 38.213 v17.1.0; "NR, Physical Layer Procedures for Control"; 3GPP TS 38.214 v17.1.0; "NR, Physical Layer Procedures for Data"; 3GPP TS 38.321 v17.0.0, "NR; Medium Access Control (MAC) protocol specification"; 3GPP TS 38.331 v17.0.0, "NR; Radio Resource Control (RRC) Protocol Specification;" 3GPP TS 36.211 v17.1.0, "Evolved Universal Terrestrial Radio Access (E-UTRA); Physical channels and modulation."

The present disclosure relates generally to wireless communication systems and, more specifically, to receptions of physical downlink control channels by a user equipment (UE) according to radio access technology (RAT) of new radio (NR) in presence of intra-cell or inter-cell interference according to radio access technology of long term evolution (LTE). Depending on the network type, the term 'base station' can refer to any component (or collection of components) configured to provide wireless access to a network, such as transmit point (TP), transmit-receive point (TRP), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access, long term evolution, LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, vehicle, or user device. A UE can be a mobile device or a stationary device.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or bands, so as to accomplish higher data rates or in lower frequency bands, such as 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
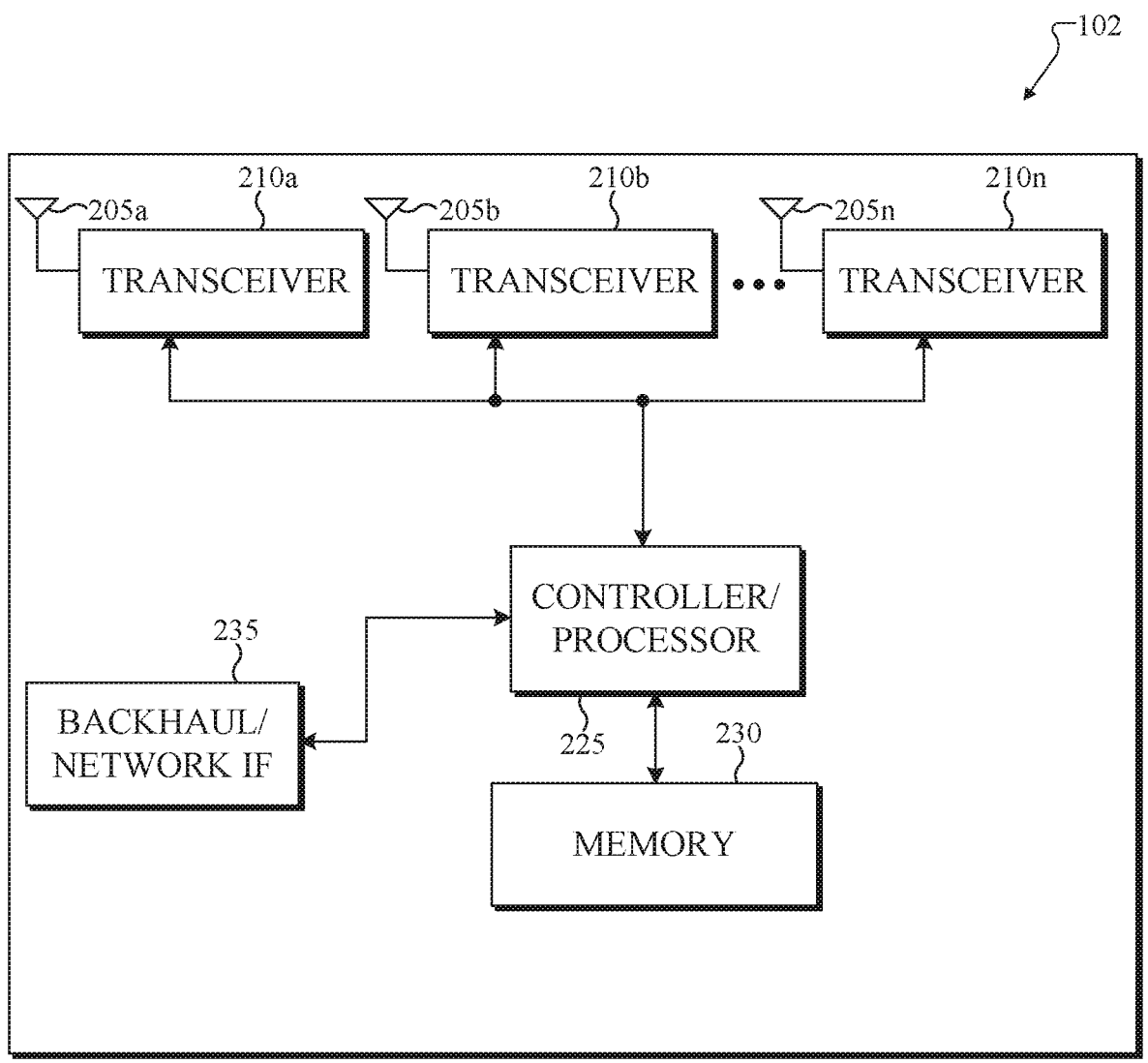
FIG. 2 illustrates an example gNodeB (gNB) according to embodiments of the present disclosure.
Figure 3:
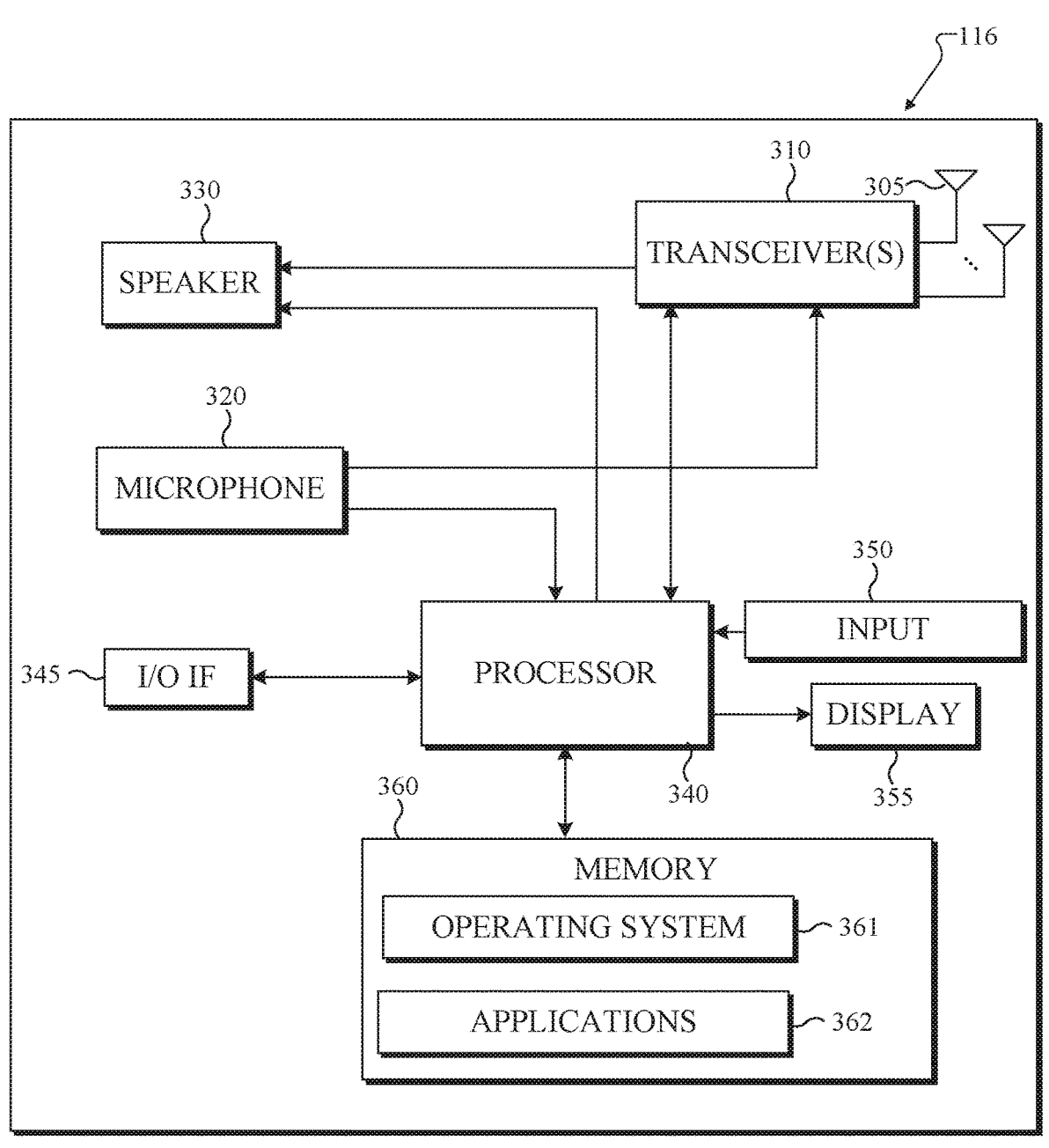
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115, the UE 116, UE 117 and UE 118. In some embodiments, one or more of the gNBs 101-103 may communicate with each other and with the UEs 111-118 using 5G, long-term evolution (LTE), LTE-A, WiMAX, or other advanced wireless communication techniques. In some embodiments, multiple UEs, e.g., UE 117, UE 118 and UE 119 may communicate directly with each other through device-2-device communication. In some embodiments, a UE, e.g., UE 119, is outside the coverage area of the network, but can communicate with other UEs inside the coverage area of the network, e.g., UE 118, or outside the coverage area of the network.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

As described in more detail below, one or more of the UEs 111-116 include circuitry, programing, or a combination thereof for reception of control signaling in the presence of interference. In certain embodiments, one or more of the gNBs 101-103 include circuitry, programing, or a combination thereof for supporting reception of control signaling in the presence of interference.

FIG. 2 illustrates an example gNB 102 according to this disclosure. The embodiment of the gNB 102 shown in FIG. 2 is for illustration only, and other gNBs of FIG. 1 can have the same or similar configuration. However, gNBs come in a wide variety of configurations, and FIG. 2 does not limit the scope of this disclosure to any particular implementation of an gNB. It is noted that gNB 101 and gNB 103 can include the same or similar structure as gNB 102.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting reception of control signaling in the presence of interference. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as process for reception of control signaling in the presence of interference. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
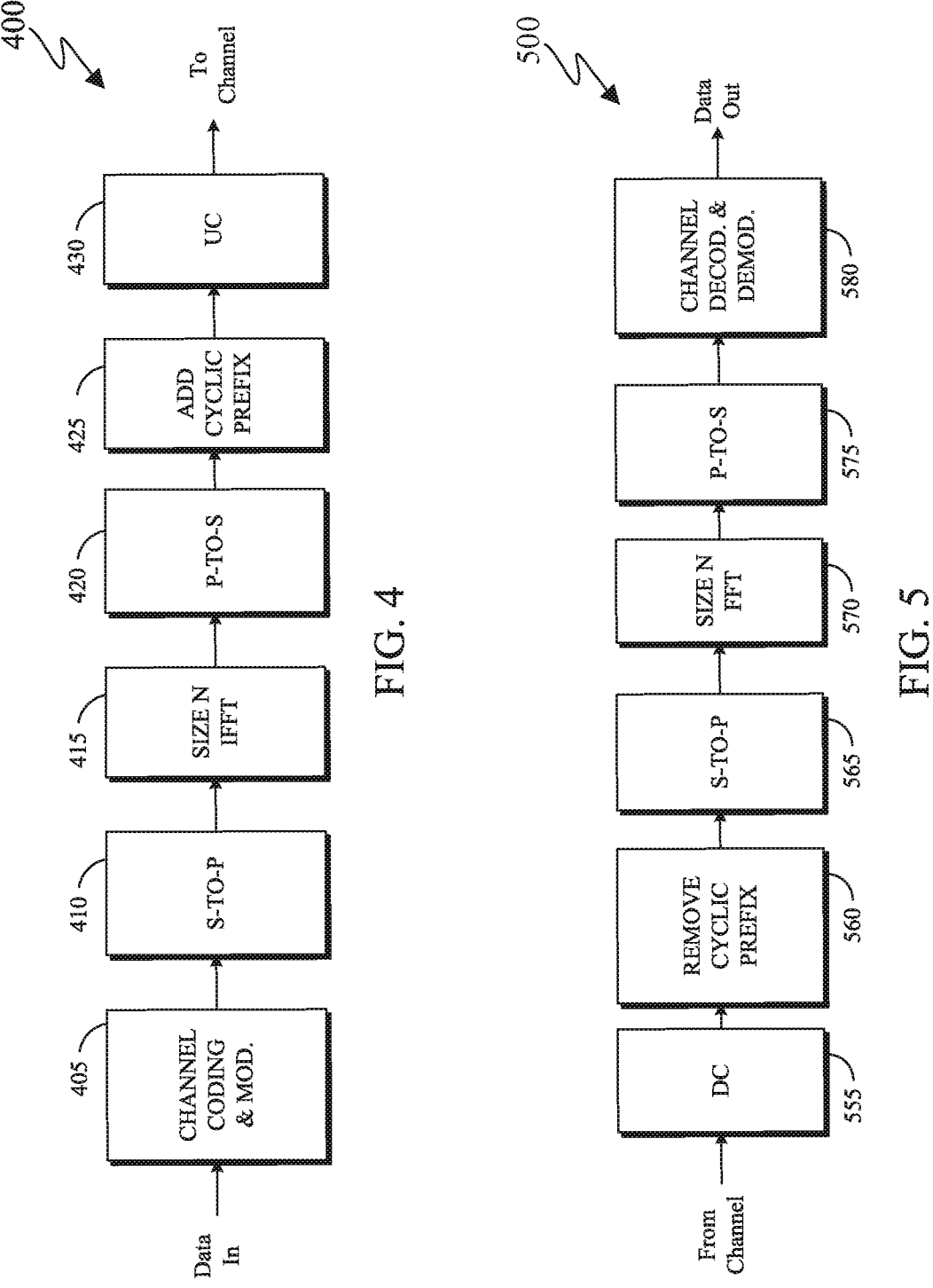
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a gNB (such as the gNB 102), while a receive path 500, of FIG. 5, may be described as being implemented in a UE (such as a UE 116). However, it may be understood that the receive path 500 can be implemented in a gNB and that the transmit path 400 can be implemented in a UE. In some embodiments, the receive path 500 is configured to support the reception of control signaling in the presence of interference scheduling as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the gNB s 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

DL transmissions or UL transmissions can be based on an OFDM waveform including a variant using DFT preceding that is known as DFT-spread-OFDM that is typically applicable to UL transmissions.

In the following, subframe (SF) refers to a transmission time unit for the LTE RAT and slot refers to a transmission time unit for an NR RAT. For example, the slot duration can be a sub-multiple of the SF duration. NR can use a different DL or UL slot structure than an LTE SF structure. Differences can include a structure for transmitting physical downlink control channels (PDCCHs), locations and structure of demodulation reference signals (DM-RS), transmission duration, and so on. Further, eNB refers to a base station serving UEs operating with LTE RAT and gNB refers to a base station serving UEs operating with NR RAT. Exemplary embodiments consider a same numerology, that includes a sub-carrier spacing (SCS) configuration and a cyclic prefix (CP) length for an OFDM symbol, for transmission with LTE RAT and with NR RAT. In such case, OFDM symbols for the LTE RAT as same as for the NR RAT, a subframe is same as a slot and, for brevity, the term slot is subsequently used in the remainder of the present disclosure.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu} \cdot 15$ kHz. A unit of one sub-carrier over one symbol is referred to as resource element (RE). A unit of one RB over one symbol is referred to as physical RB (PRB).

DL signaling include physical downlink shared channels (PDSCHs) conveying information content, PDCCHs conveying DL control information (DCI), and reference signals (RS). A PDCCH can be transmitted over a variable number of slot symbols including one slot symbol and over a number of control channel elements (CCEs) from a predetermined set of numbers of CCEs referred to as CCE aggregation level within a control resource set (CORESET) as described in 3GPP TS 36.211 v17.1.0, "NR; Physical channels and modulation", and 3GPP TS 38.213 v17.1.0 "NR; Physical Layer procedures for control".

Figure 6:
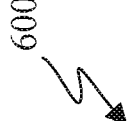
FIG. 6 illustrates an example transmitter structure using orthogonal frequency-division multiplexing (OFDM) according to embodiments of the present disclosure.
Figure 6:
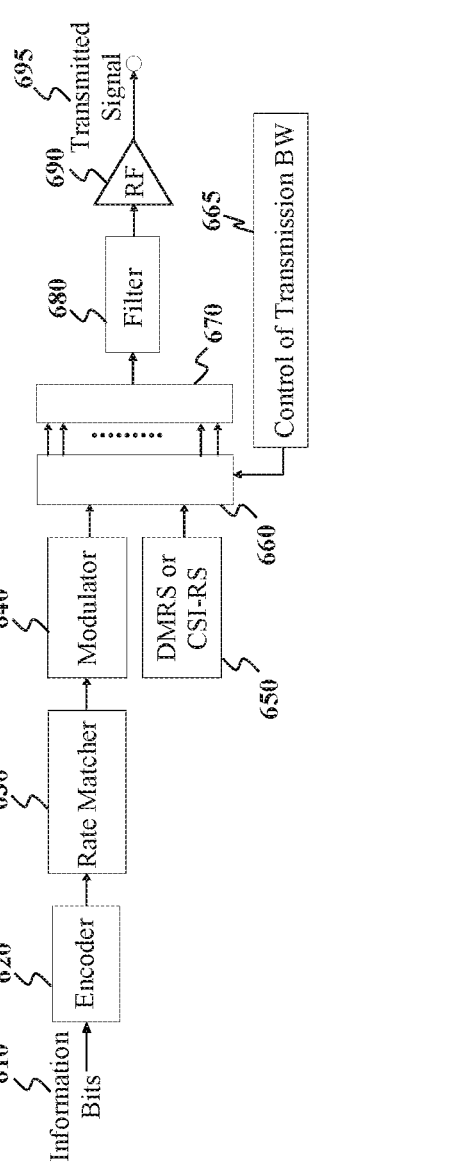

FIG. 6 illustrates an example transmitter structure using OFDM 600 according to embodiments of the present disclosure. The embodiment of the transmitter structure using OFDM 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter structure using OFDM 600.

As shown in FIG. 6, information bits, such as DCI bits or data bits 610, are encoded by encoder 620, rate matched to assigned time/frequency resources by rate matcher 630, and modulated by modulator 640. Subsequently, modulated encoded symbols and DMRS or CSI-RS 650 are mapped to SCs 660 by RE mapping unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit 695.

Figure 7:
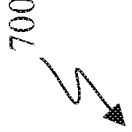
FIG. 7 illustrates an example receiver structure using OFDM according to embodiments of the present disclosure.
Figure 7:
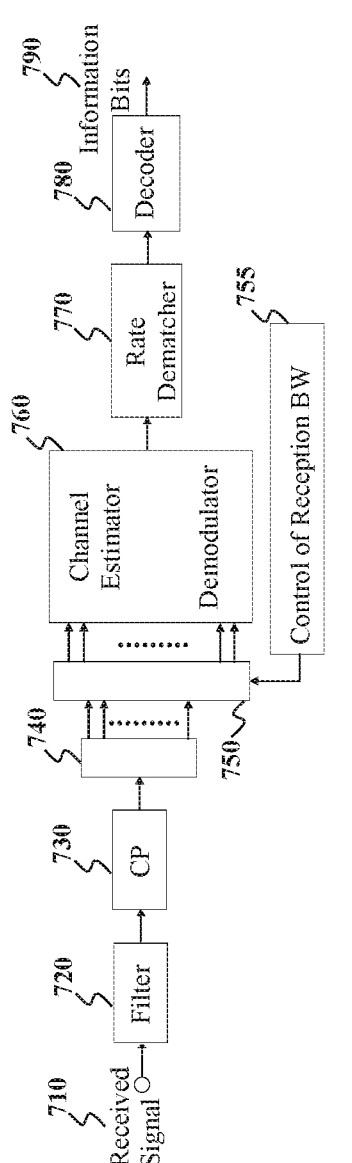

FIG. 7 illustrates an example receiver structure using OFDM 700 according to embodiments of the present disclosure. The embodiment of the receiver structure using OFDM 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the receiver structure using OFDM 700.

As shown in FIG. 7, a received signal 710 is filtered by filter 720, a CP removal unit removes a CP 730, a filter 740 applies a fast Fourier transform (FFT), REs de-mapping unit 750 de-maps REs selected by BW selector unit 755, received symbols are demodulated by a channel estimator and a demodulator unit 760, a rate de-matcher 770 restores a rate matching, and a decoder 780 decodes the resulting bits to provide information bits 790.

DCI can serve several purposes. A DCI format includes information elements (IEs) and is typically used for scheduling a PDSCH (DL DCI format) or a PUSCH (UL DCI format) transmission. A DCI format includes cyclic redundancy check (CRC) bits in order for a UE to confirm a correct detection. A DCI format type is identified by a radio network temporary identifier (RNTI) that scrambles the CRC bits. For a DCI format scheduling a PDSCH or a PUSCH for a single UE with RRC connection to an eNB, the RNTI is a cell RNTI (C-RNTI) or another RNTI type such as an MCS-C-RNTI. For a DCI format scheduling a PDSCH conveying system information (SI) to a group of UEs, the RNTI is a SI-RNTI. For a DCI format scheduling a PDSCH providing a response to a random access (RA) from a group of UEs, the RNTI is a RA-RNTI. For a DCI format scheduling a PDSCH providing contention resolution in Msg4 of a RA process, the RNTI is a temporary C-RNTI (TC-RNTI). For a DCI format scheduling a PDSCH paging a group of UEs, the RNTI is a P-RNTI. For a DCI format providing transmission power control (TPC) commands to a group of UEs, the RNTI is a TPC-RNTI, and so on. Each RNTI type is configured to a UE through higher layer signaling. A UE typically decodes at multiple candidate locations for potential PDCCH transmissions.

Figure 8:
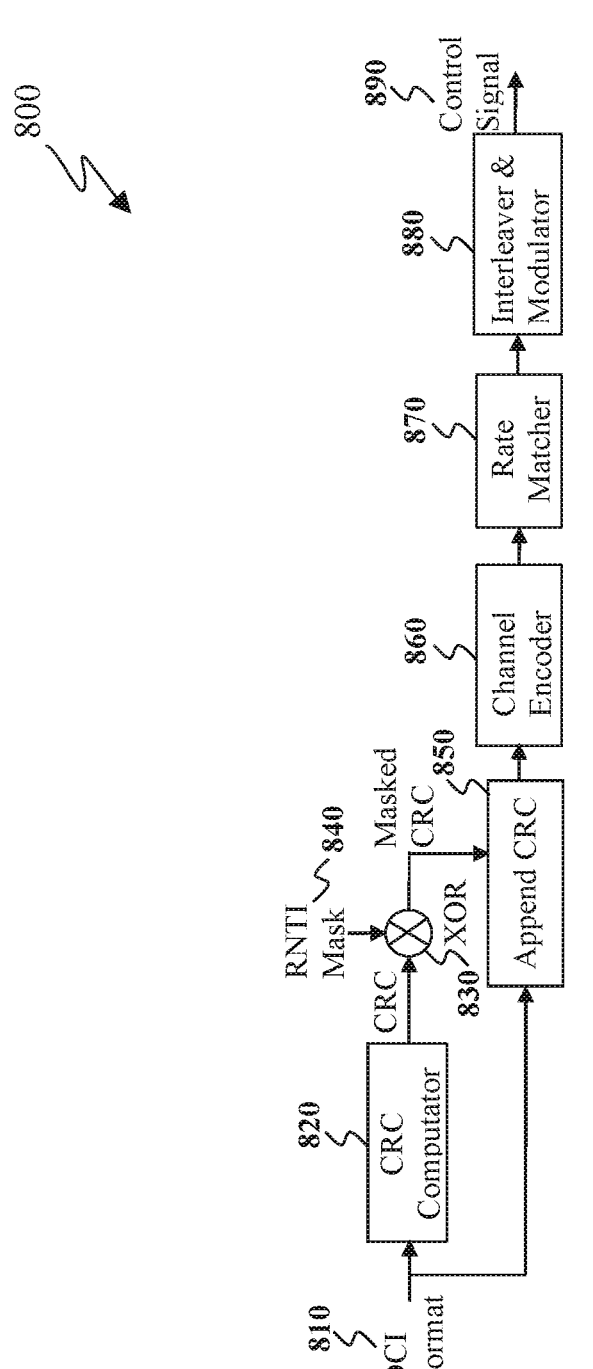
FIG. 8 illustrates an example encoding process for a downlink control information (DCI) format according to embodiments of the present disclosure.

FIG. 8 illustrates an example encoding process 800 for a DCI format according to embodiments of the present disclosure. The embodiment of the encoding process 800 for a DCI format illustrated in FIG. 8 is for illustration only. FIG. 8 does not limit the scope of this disclosure to any particular implementation of the encoding process 800 for a DCI format.

A gNB separately encodes and transmits each DCI format in a respective PDCCH. When applicable, an RNTI for a UE that a DCI format is intended for masks a CRC of the DCI format codeword in order to enable the UE to identify the DCI format. For example, the CRC can include 24 bits and the RNTI can include 16 bits or 24 bits. The CRC of (non-coded) DCI format bits 810 is determined using a CRC computation unit 820, and the CRC is masked using an exclusive OR (XOR) operation unit 830 between CRC bits and RNTI bits 840. The XOR operation is defined as $XOR(0,0)=0, XOR(0,1)=1, XOR(1,0)=1, XOR(1,1)=0$. The masked CRC bits are appended to DCI format information bits using a CRC append unit 850. An encoder 860 performs channel coding, such as polar coding, followed by rate matching to allocated resources by rate matcher 870. Interleaving and modulation units 880 apply interleaving and modulation, such as QPSK, and the output control signal 890 is transmitted.

Figure 9:
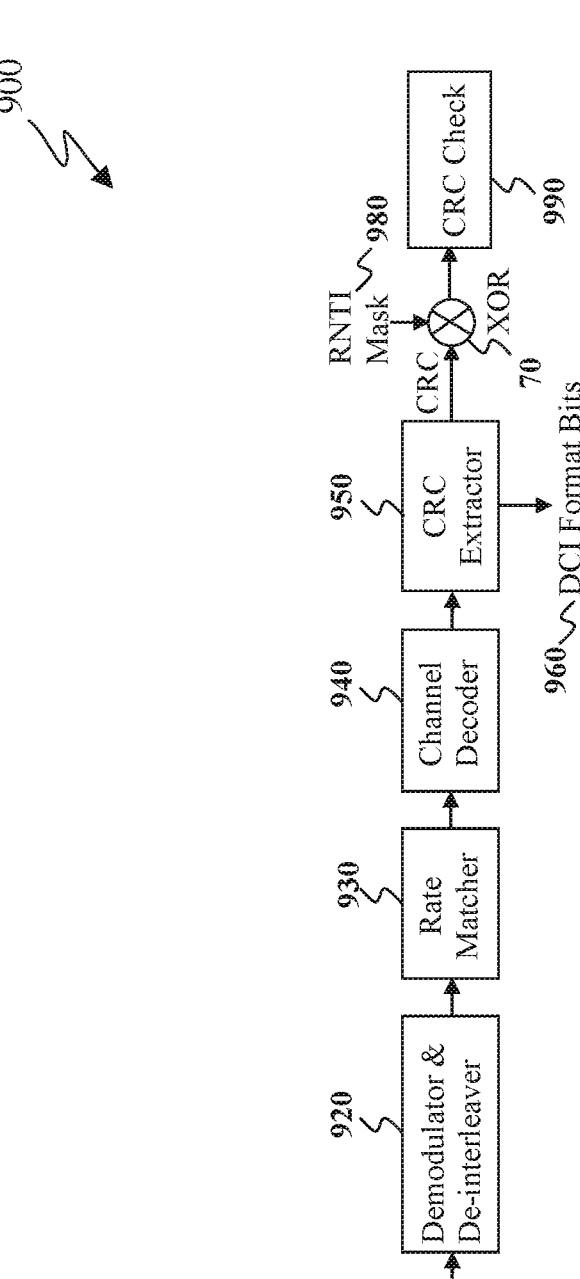
FIG. 9 illustrates an example decoding process for a DCI format according to embodiments of the present disclosure.

FIG. 9 illustrates an example decoding process 900 for a DCI format according to embodiments of the present disclosure. The embodiment of the decoding process 900 for a DCI format illustrated in FIG. 9 is for illustration only. FIG. 9 does not limit the scope of this disclosure to any particular implementation of the decoding process 900 for a DCI format.

A received control signal 910 is demodulated and de-interleaved by a demodulator and a de-interleaver 920. A rate matching applied at a gNB transmitter is restored by rate matcher 930, and resulting bits are decoded by decoder 940. After decoding, a CRC extractor 950 extracts CRC bits and provides DCI format information bits 960. The DCI format information bits are de-masked 970 by an XOR operation with a RNTI 980 (when applicable) and a CRC check is performed by unit 990. When the CRC check succeeds (check-sum is zero), the DCI format information bits are considered to be valid. When the CRC check does not succeed, the DCI format information bits are considered to be invalid.

When an NR RAT is introduced in an existing LTE network, both LTE and NR may need to co-exist in a same or in an overlapping spectrum. Spectrum sharing is then required to support LTE and NR coexistence. Spectrum sharing mechanisms can depend on several factors including whether or not an LTE scheduler and an NR scheduler can perform coordinated scheduling and whether or not a UE capable for operating with an NR RAT can also operate with an LTE RAT. Coordinated scheduling is typically possible when an eNB scheduler for LTE and a gNB scheduler for NR are collocated, in such case even a same scheduler for LTE and NR can be possible, or connected via a backhaul with materially negligible latency in order to exchange dynamic configurations over respective interfaces. Non-coordinated scheduling is typically required when conditions for coordinated scheduling cannot be fulfilled.

A common reference signal (CRS) is an LTE signal that LTE UEs expect an eNB to always transmit in normal DL slots or at the first one or two symbols of a multicastbroadcast single frequency network (MBSFN) slot. For a CRS transmission from four antenna ports, the CRS mapping includes the first two symbols of the slot, as described in 3GPP TS 36.211 v17.1.0, "E-UTRA; Physical channels and modulation". The DM-RS mapping for NR PDCCH transmissions, as described in 3GPP TS 38.211 v17.1.0, "NR; Physical channels and modulation", is different than the CRS mapping and it is not possible to avoid some REs with DM-RS transmission associated with an NR PDCCH also being used for CRS transmission. As a consequence, and in order to avoid an impact on the operation of LTE UEs, a gNB may puncture NR PDCCH transmission on such DM-RS REs thereby resulting to non-uniform DM-RS pattern for the NR PDCCH in symbols where CRS is transmitted, and the pattern also depends on the number of REs used as a shift for the CRS transmission.

Various embodiments of the present disclosure recognize that one approach to address CRS and NR PDCCH transmissions occupying same REs in a symbol is to avoid such collisions and require that CRS and NR PDCCH transmissions are in different symbols. An NR UE can be provided, for example by lte-CRS-ToMatchAround as described in 3GPP TS 38.213 v17.1.0 "NR; Physical Layer procedures for control", a pattern for CRS transmissions and, if any RE of PDCCH candidate is the same as a CRS RE in a same symbol, the UE is not required to receive the PDCCH candidate.

Various embodiments of the present disclosure recognize that another approach is for a UE to assume that there are no REs used for DM-RS transmission associated with NR PDCCH symbols indicated for CRS transmission, for example by lte-CRS-ToMatchAround, and for the UE to use only DM-RS received in symbols without CRS to perform channel estimation for coded modulated symbols of a DCI format for the NR PDCCH. A shortcoming of the later approach is that it limits channel estimation only to symbols without CRS transmission, thereby reducing an accuracy of a channel estimate obtained based on DM-RS reception and reducing an accuracy for the demodulation of the coded modulated symbols of the DCI format and the reception reliability of the DCI format. Another shortcoming of the latter approach is that it requires REs that are associated with DM-RS transmission to remain empty, or with undetermined DM-RS presence, when not colliding with CRS REs in a symbol with CRS transmission or to introduce a different rate matching for NR PDCCH in such symbols so that REs used for coded modulation symbols include DM-RS REs that are not used for CRS transmission in the symbol.

Puncturing REs associated with an NR PDCCH transmission, when a network would transmit both CRS and NR PDCCH in the REs, enables receptions using the CRS to remain unaffected while penalizing NR PDCCH receptions. Nevertheless, CRS REs are typically more important for first and second antenna ports, as they are also used for measurements, and are somewhat less critical for third and fourth antenna ports. Further, an RE where both DM-RS for an NR PDCCH and CRS would be transmitted according to system specifications corresponds to a same antenna port for CRS transmission. As DM-RS transmission is also important for NR PDCCH reception reliability, it is beneficial to enable a network to be able to inform a UE whether a DM-RS is transmitted or not transmitted in an RE where CRS would also be transmitted according to system specifications.

Coexistence in a same CORESET of first UEs supporting puncturing of PDCCH receptions in symbols and REs of CRS transmission and of second, legacy, UEs that do not support such puncturing is beneficial to avoid fragmentation of resources and improve coverage. NR PDCCH receptions typically cannot be supported in a first symbol of a slot because of transmission of channels such as a PHICH and a PCFICH, as defined in 3GPP TS 36.211 v17.1.0, "E-UTRA; Physical channels and modulation", in addition to CRS. Otherwise, if a CORESET for the second UEs is located only in a third symbol of a slot where there is no CRS transmission, due to the typically small bandwidths associated with LTE-NR coexistence such as 10 MHz or 20 MHz, a CORESET for the first UEs that includes the second symbol of the slot cannot be over non-overlapping PRB s relative to the CORESET for the second UEs and needs to be contained only in the second symbol of the slot because, due to REG mapping an interleaving, it is not practically possible to support non-overlapping PDCCH transmissions in CORESETs that overlap in the frequency domain and include different symbols in the time domain. Such separation of CORESETs in the time domain can lead to resource fragmentation for PDCCH transmissions and reduced coverage at least for the first UEs as, due to puncturing, PDCCH receptions in a symbol with CRS transmission would be smaller than PDCCH receptions in a symbol without CRS transmission.

Various embodiments of the present disclosure recognize that there is a need to enable an NR PDCCH reception to include a symbol with LTE CRS without requiring a different UE procedure for channel estimation using DM-RS for the NR PDCCH in the symbol. In addition, various embodiments of the present disclosure recognize that there is a need to enable a differentiation for rate matching due to CRS transmission in REs with coded modulation symbols and in REs with DM-RS for an NR PDCCH reception. Further, various embodiments of the present disclosure recognize that there is a need to enable a network to indicate to a UE whether or not a DM-RS is transmitted in an RE where a CRS would also be transmitted, or in a symbol that includes REs where a CRS would be transmitted, according to system specifications. In addition, various embodiments of the present disclosure recognize that there is a need to enable PDCCH receptions in a CORESET that includes symbols with CRS transmission by first UEs that support PDCCH receptions over symbols that include a symbol with CRS transmission and by second UEs that do not support PDCCH receptions over symbols that include a symbol with CRS transmission.

Accordingly, various embodiments of the present disclosure provide mechanisms for enabling an NR PDCCH reception to include a symbol with LTE CRS REs without requiring a different UE procedure for channel estimation using DM-RS for the NR PDCCH in the symbol. Various embodiments of the present disclosure provide mechanisms for enabling a differentiation for rate matching due to CRS transmission in REs with coded modulation symbols and in REs with DM-RS for an NR PDCCH reception. Various embodiments of the present disclosure provide mechanisms for enabling a network to indicate to a UE whether or not a DM-RS is transmitted in an RE where a CRS would also be transmitted, or in a symbol that includes REs where a CRS would be transmitted, according to system specifications. Various embodiments of the present disclosure provide mechanisms for enabling PDCCH receptions in a CORESET that includes symbols with CRS transmission by first UEs that support PDCCH receptions over symbols that include a symbol with CRS transmission and by second UEs that do not support PDCCH receptions over symbols that include a symbol with CRS transmission.

The term "higher layers" is used to denote control information that a UE is provided in a PDSCH reception, such as radio resource control (RRC) or a medium access control (MAC) control element (CE).

In the following, PDCCH refers to NR PDCCH, CRS refers to LTE CRS, DM-RS refers to the demodulation RS of the NR PDCCH, and DCI symbols refer to coded modulated symbols of a DCI format provided by the NR PDCCH that is also referred to as PDCCH.

One embodiment of the present disclosure considers rate matching procedures for NR PDCCH reception in a symbol with LTE CRS transmission.

When a PDCCH transmission and a CRS transmission are in a same symbol of a slot, a physical resource block (PRB) of twelve resource elements (REs) over the symbol includes four REs with CRS transmission, having a uniform spacing of three REs as described in 3GPP TS 36.211 v17.1.0, "E-UTRA; Physical channels and modulation", and includes three REs with DM-RS transmission for the PDCCH having a uniform spacing of four REs as described in 3GPP TS 38.211 v17.1.0, "NR; Physical channels and modulation". Therefore, within the PRB, one RE is used for transmission of both DM-RS and CRS and three REs are used for transmission of both DCI symbols and CRS. Equivalently, 25% of the REs used for DM-RS reception in the PRB may provide inaccurate information when CRS is instead received and 33.3% of the REs used for reception of DCI symbols in the PRB may provide inaccurate information when CRS is instead received.

Puncturing reception by a UE of DM-RS and DCI symbols in REs of a PRB that can be used for CRS transmission has different implications for DM-RS used for channel estimation than for DCI symbols. When REs used for DM-RS reception are punctured, a consequence is that either the DM-RS pattern in the symbol becomes non-uniform or, in order to maintain a uniform DM-RS pattern, there is no DM-RS transmission in the symbol and channel estimation is then based only on DM-RS in other symbols of the PDCCH transmission, if any. Although the latter option maintains a uniform DM-RS structure, some changes in channel estimation procedure are required and there can be loss in a reception reliability of the DCI symbols due to the DM-RS absence in the symbol as 75% of the DM-RS REs are valid and do not instead include CRS transmission. A UE that cannot perform channel estimation based on a non-uniform DM-RS structure can indicate a capability to receive PDCCH only when at least one symbol of the PDCCH does not include REs indicated for CRS transmission. The UE can then perform channel estimation for the PDCCH reception using the uniform DM-RS structure in the symbols of the PDCCH that do not include REs indicated for CRS transmission.

Additionally, due to presence of first/legacy UEs that do not support PDCCH receptions in a symbol that includes CRS transmission, a CORESET for such first UEs to receive PDCCHs needs to include symbols where CRS is not transmitted. For relatively small system bandwidths associated with LTE-NR coexistence, such as 10 MHz or 20 MHz, it is generally not possible to extend a first CORESET that includes symbols with CRS transmission to also include symbols without CRS transmission. That is because a bandwidth of the first CORESET would overlap with a bandwidth of a second CORESET, such as a CORESET with index 0 as described in TS 38.213 v17.1.0 "NR; Physical Layer procedures for control" that is used for PDCCH receptions by the first UEs and, due to a dependence of PDCCH mapping and interleaving on a number of symbols of a CORESET as described in 3GPP TS 38.211 v17.1.0, "NR; Physical channels and modulation", it is not possible to have simultaneous PDCCH transmissions over a same or overlapping bandwidth in CORESETs spanning a different number of symbols.

Considering the above, an absence of DM-RS transmission in a symbol with CRS transmission is typically not desirable or feasible. In such cases, in order to enable PDCCH transmission in a symbol with CRS transmission, puncturing of a PDCCH reception can include REs used for DCI symbols where CRS transmission can also occur while puncturing of REs used for DM-RS transmission can be separately indicated and it is then up to the network whether to transmit CRS or transmit DM-RS in the symbol. Additionally, a UE can indicate a capability to receive PDCCH in any symbols, regardless of presence or absence of REs indicated for CRS transmission in the symbols, for example when the UE can perform channel estimation based on a non-uniform DM-RS pattern resulting from a punctured/absence of DM-RS transmission in an RE of a PRB where CRS can be transmitted. That capability indication can enable the network to be aware of a degradation in a reliability of a DCI format reception by the UE and adjust accordingly a number of control channel elements (CCEs) used to transmit the PDCCH to the UE.

It is also possible that a network is expected by default to transmit CRS and then the network can provide an indication for whether, in a symbol with CRS REs, DM-RS is transmitted or not transmitted in REs of the symbol that do not overlap with CRS REs. For example, if the indication is that DM-RS is transmitted, a UE may use the DM-RS for channel estimation while if the indication is that DM-RS is not transmitted, such as when the network finds it preferable to leave corresponding REs without any transmission and use an associated power for power boosting of other signaling, the UE may use only the DM-RS in symbols without CRS REs for channel estimation associated with demodulation of coded-modulated symbols of a DCI format.

For example, a network can inform a UE, via a system information block or via UE-specific higher layer signaling, of a CRS matching pattern by a parameter, such as lte-CRS-ToMatchAround-new. Then, in symbols and REs that include CRS transmission, the UE rate matches (punctures/skips) reception of DCI symbols. The parameter lte-CRS-ToMatchAround-new can be different than a lte-CRS-ToMatchAround parameter provided to legacy UEs as described in TS 38.331 v17.0.0 "NR; Radio Resource Control (RRC) protocol specification". For example, lte-CRS-ToMatchAround-new may not include an indication for the number of CRS port which can be set to four, or an indication for the CRS bandwidth which can be set to include the bandwidth of the CORESET with the PDCCH transmission, or an indication of MBSFN subframes as it is not relevant when the PDCCH transmission is only in the second symbol of a slot and four antenna ports are used for the CRS transmission.

The network may separately inform the UE whether or not to rate match reception of DM-RS in REs of symbols that include CRS transmission. For example, the network can provide, via a system information block or via UE-specific higher layer signaling, a parameter lte-CRS-ToMatchDM-RS, with values 'enabled' or 'disabled', or with a value of 'disabled' when puncturing is default/enabled when the parameter is not provided by the network. Regardless of whether or not a separate parameter for enabling/disabling DM-RS puncturing is provided to a UE by the network, the UE can indicate a capability to receive PDCCH in any symbols, for example by performing channel estimation by discarding DM-RS REs that are indicated by lte-CRS-ToMatchAround-new to be used for CRS transmission or, when the UE is not capable to perform channel estimation based on a non-uniform DM-RS structure, the UE can indicate a capability to receive PDCCH only when at least one of the symbols for the PDCCH reception does not include any REs indicated for CRS transmission.

Figure 10:
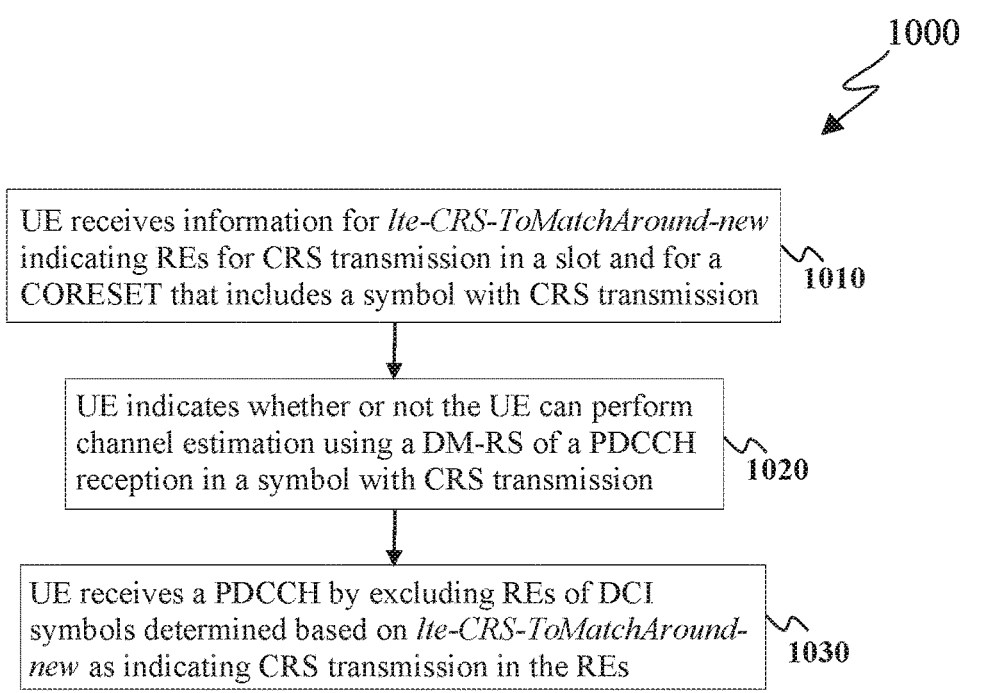
FIG. 10 illustrates an example method for receiving a PDCCH in a physical resource block (PRB) where a CRS is transmitted according to embodiments of the present disclosure.

FIG. 10 illustrates an example method 1000 for a UE to receive PDCCH in a PRB where CRS is transmitted according to embodiments of the present disclosure. The embodiment of the example method 1000 for a UE to receive PDCCH in a PRB where CRS is transmitted illustrated in FIG. 10 is for illustration only. FIG. 10 does not limit the scope of this disclosure to any particular implementation of the example method 1000 for a UE to receive PDCCH in a PRB where CRS is transmitted.

As illustrated in FIG. 10, the method 1000 begins at step 1010, where a UE (such as the UE 116) receives first information for a parameter lte-CRS-ToMatchAround-new indicating REs for CRS transmission in a slot and second information for a CORESET and an associated search space set for PDCCH receptions. The CORESET includes a symbol with CRS transmission as determined by the parameter. For example, the parameter can indicate an RE shift for determining a location of REs used for CRS in a PRB and, when the UE is provided the parameter, the UE can assume that a number of CRS ports is four. At step 1020, the UE provides an indication of a capability for whether or not the UE can perform channel estimation using a DM-RS of a PDCCH reception in a symbol with CRS transmission, that is for whether or not the UE requires at least one symbol of the PDCCH reception to not include any REs indicated for CRS transmission. At step 1030, the UE receives a PDCCH by excluding REs of DCI symbols that are determined based on lte-CRS-ToMatchAround-new as indicating a CRS transmission in the REs. The UE may additionally exclude REs for reception of DM-RS that are determined based on lte-CRS-ToMatchAround-new as indicating a CRS transmission in the REs.

One embodiment of the present disclosure considers mechanisms to enable a network to control a reliability for receptions or measurements based on a CRS or on a DM-RS.

A CRS and a DM-RS are transmitted in a same RE once per PRB of a symbol with CRS and DM-RS transmission. Moreover, the CRS transmission is from a same antenna port. A network can control a reliability for receptions or measurements based on a CRS or on a DM-RS by indicating a pattern where DM-RS is transmitted or is not transmitted in a RE where both the DM-RS and the CRS would otherwise be transmitted based on system specifications as described in TS 36.211 v17.1.0, "E-UTRA; Physical channels and modulation" and TS 38.211 v17.1.0 "NR; Physical channels and modulation". The pattern can be in granularity of RBs, or REGs, or in multiples of RBs or REGs. When all PRBs/REGs of the symbol are not used for PDCCH transmissions, the network may also be able to choose PRBs/REGs with DM-RS transmission for the PDCCH transmission and avoid PRBs/REGs without DM-RS transmissions in REs where both DM-RS and CRS would otherwise be transmitted based on system specifications.

A UE that can perform channel estimation based on a modified DM-RS pattern, relative to the one described in TS 38.211 v17.1.0 "NR; Physical channels and modulation", can include REs where DM-RS is transmitted based on a corresponding indication for DM-RS transmission from the pattern provided by the network for REs where both DM-RS and CRS would be transmitted based on system specifications. Conversely, for channel estimation, the UE can exclude REs where DM-RS is not transmitted based on a corresponding indication for DM-RS transmission from the pattern. Instead of a pattern, a gNB can provide an indication, such as by a SIB or by UE-specific higher layer signaling, for whether or not DM-RS is transmitted in REs of a symbol that includes CRS REs, other than in REs overlapping with CRS REs. For example, the gNB can indicate the DM-RS is not transmitted in any REs of a symbol of a CORESET when the symbol includes DM-RS REs overlapping with CRS REs. That can prevent a UE implementation from using DM-RS REs in a symbol of a CORESET that includes CRS REs and the gNB can use, for example, DM-RS REs that do not overlap with CRS REs (in a symbol of a CORESET that includes CRS REs) to increase a transmission power for coded modulated symbols of PDCCH candidates in the symbol.

Figure 11:
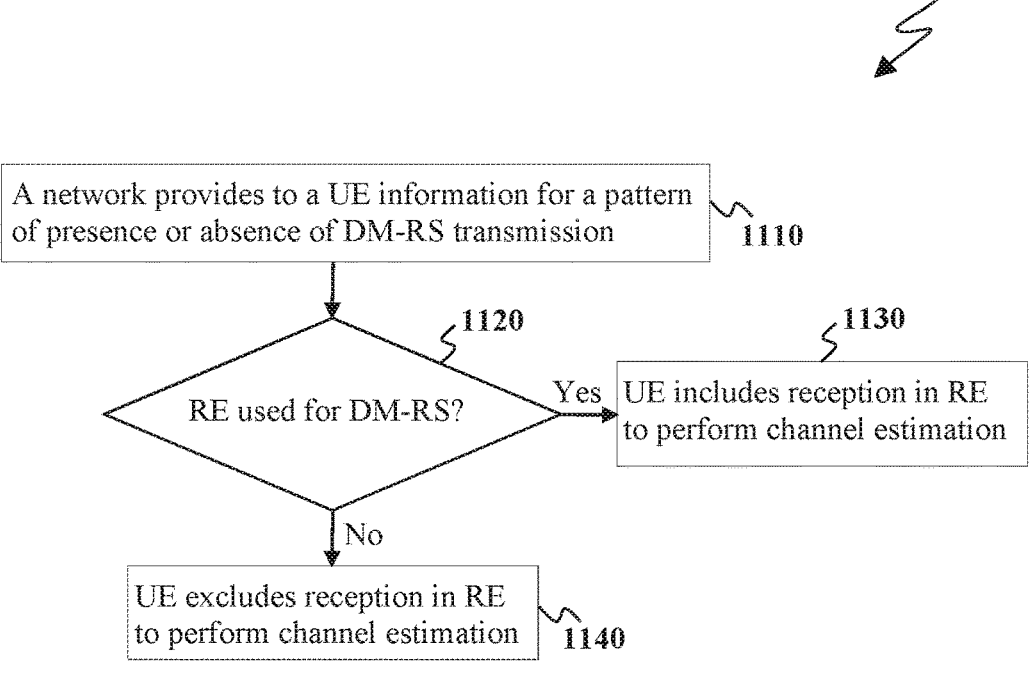
FIG. 11 illustrates an example method for informing a UE of REs used for DM-RS transmission and of REs used for CRS transmission among REs that could be used both for DM-RS transmission and CRS transmission according to embodiments of the present disclosure.

FIG. 11 illustrates an example method 1100 for informing a UE of REs used for DM-RS transmission and of REs used for CRS transmission among REs that could be used both for DM-RS transmission and CRS transmission according to embodiments of the present disclosure. The embodiment of the method 1100 for informing a UE of REs used for DM-RS transmission and of REs used for CRS transmission among REs that could be used both for DM-RS transmission and CRS transmission illustrated in FIG. 11 is for illustration only. FIG. 11 does not limit the scope of this disclosure to any particular implementation of the method 1100 for informing a UE of REs used for DM-RS transmission and of REs used for CRS transmission among REs that could be used both for DM-RS transmission and CRS transmission.

As illustrated in FIG. 11, the method 1100 begins at step 1110, where a network provides to a UE information for a pattern of presence or absence of DM-RS transmission. The pattern corresponds to REs where both DM-RS associated with PDCCH receptions and CRS would be transmitted in a symbol of a CORESET based on system specifications. The granularity of the pattern can be predetermined, such as a PRB, a REG, or a predetermined multiple of PRBs/REGs or it can also be indicated by the network such as, for example, by indicating a multiple of PRBs including all PRBs in the symbol. The pattern can be in a form of a bitmap where a value of '0' indicates DM-RS transmission and a value of '1' indicates absence of DM-RS transmission, or the reverse, where the pattern reduces to a single bit when it is applicable to all PRBs in a symbol of a CORESET that includes CRS REs. At step 1120, based on the pattern, the UE determines whether or not DM-RS is transmitted in a RE. The RE can be a first RE where both DM-RS and CRS would otherwise be transmitted, or a second RE where only DM-RS would otherwise be transmitted, based on system specifications. When the UE determines that the DM-RS is transmitted in the RE, then at step 1130 the UE uses the reception in the RE to perform channel estimation; otherwise, at step 1140, the UE excludes the reception in the RE from the receptions in REs that the UE uses to perform channel estimation.

One embodiment of the present disclosure considers mechanisms to enable PDCCH receptions in a CORESET that includes a symbol for CRS transmissions by first UEs that support puncturing of PDCCH receptions in REs indicated for CRS transmission and by second UEs that do not support puncturing of PDCCH receptions in REs indicated for CRS transmission.

The exemplary embodiment considers a CORESET that includes a second and a third symbol in a slot and that CRS transmission is on the second symbol of the slot according to the specifications of the LTE system operation. A network provides to a first UE that supports puncturing of PDCCH receptions in REs indicated for CRS transmission a first parameter lte-CRS-ToMatchAround-new that indicates presence of CRS in REs of the second symbol of the slot and the first UE rate matches (punctures) reception of DCI symbols and of DM-RS in the REs. Also, unless the first UE indicates a capability to perform channel estimation when DM-RS is punctured in some REs of a symbol or, in general, to receive PDCCH in REs that include REs indicated for CRS transmission, DM-RS may be punctured in all REs of the second symbol and the first UE can perform channel estimation based only on reception of DM-RS in the third symbol. The network provides to a second UE that does not support puncturing of PDCCH receptions in REs indicated for CRS transmission a second parameter lte-CRS-ToMatchAround that does not indicate presence of CRS in REs of the second symbol of the slot, such as for example a CRS transmission from only two antenna ports as described in 3GPP TS 36.211 v17.1.0, "NR; Physical channels and modulation", or does not provide any parameter indicating CRS presence. The second UE does not rate match (puncture) reception of DCI symbols and of DM-RS in any REs of the second symbol.

FIG. 12 illustrates an example method 1200 for a network to support, in a CORESET that includes a symbol with CRS transmission, PDCCH receptions by a first UE that supports puncturing PDCCH receptions in REs and PDCCH receptions by a second UE that does not support puncturing PDCCH receptions in REs according to embodiments of the present disclosure. The embodiment of the method 1200 for a network to support, in a CORESET that includes a symbol with CRS transmission, PDCCH receptions by a first UE that supports puncturing PDCCH receptions in REs and PDCCH receptions by a second UE that does not support puncturing PDCCH receptions in REs illustrated in FIG. 12 is for illustration only. FIG. 12 does not limit the scope of this disclosure to any particular implementation of the method 1200 for a network to support, in a CORESET that includes a symbol with CRS transmission, PDCCH receptions by a first UE that supports puncturing PDCCH receptions in REs and PDCCH receptions by a second UE that does not support puncturing PDCCH receptions in REs.

As illustrated in FIG. 12, the method 1200 begins at step 1210, where a network provides to a first UE first information, for example using a first parameter lte-CRS-ToMatchAround-new, indicating unavailable REs for PDCCH reception, such as REs corresponding to CRS transmission, in first symbols of a slot and provides to a second UE second information, for example using a second parameter lte-CRS-ToMatchAround, indicating unavailable REs for PDCCH reception, such as REs corresponding to CRS transmission, in second symbols of a slot or does not provide the second information. The first symbols are different from the second symbols. For example, the second symbols are a subset of the first symbols. At step 1220, the network provides to the first UE and to the second UE third information for a CORESET that includes symbols indicated to the first UE to have unavailable REs for PDCCH receptions and does not include symbols indicated to the second UE to have unavailable REs for PDCCH receptions. At step 1230, the first UE receives a PDCCH in the CORESET by excluding reception in REs indicated as unavailable by the first parameter and the second UE receives PDCCH in the CORESET by not excluding any REs.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for receiving physical downlink control channels (PDCCHs), the method comprising:
    transmitting an indication for one of:
        a first capability value to receive PDCCHs over symbols only when at least one of the symbols does not include resource elements (REs) for a common reference signal (CRS), and
        a second capability value to receive PDCCHs over symbols when any of the symbols include the REs for the CRS, wherein:
            a PDCCH is according to a new radio (NR) radio access technology (RAT), and
            the CRS is according to a long term evolution (LTE) RAT;
    receiving first information for parameters of the CRS;
    determining, based on the parameters of the CRS, the REs for the CRS in symbols of the PDCCH; and
    receiving the PDCCH based on the REs for the CRS in symbols of the PDCCH.

2. The method of claim 1, wherein:
    the PDCCH provides a downlink control information (DCI) format,
    the indication is for the second capability value, and
    the reception of the PDCCH comprises:
        channel estimation based on reception for a demodulation reference signal (DM-RS) only in REs of the PDCCH that:
        provide the DM-RS, and
        are in symbols of the PDCCH that do not include the REs for the CRS, and
        reception of the DCI format in all REs of the PDCCH that provide the DCI format excluding the REs for the CRS.

3. The method of claim 1, wherein:
    the PDCCH provides a downlink control information (DCI) format,
    the indication is for the first capability value, and
    the reception of the PDCCH comprises:
        channel estimation based on reception for a demodulation reference signal (DM-RS) in all REs of the PDCCH that provide the DM-RS, and reception of the DCI format in all REs of the PDCCH that provide the DCI format excluding the REs for the CRS.

4. The method of claim 1, wherein the PDCCH reception: is in a slot, and does not include a first symbol of the slot.

5. The method of claim 1, further comprising receiving second information indicating reception for a demodulation reference signal (DM-RS) in the REs for the CRS, wherein the DM-RS is associated with the PDCCH.

6. The method of claim 1, further comprising receiving second information indicating REs, from the REs for the CRS, without presence of the CRS.

7. The method of claim 1, further comprising receiving second information indicating REs, from the REs for the CRS, without presence of a demodulation reference signal (DM-RS) associated with the PDCCH.

8. The method of claim 1, further comprising:

receiving second information for parameters of a second CRS, wherein:

the CRS is associated with a first number of antenna ports, the second CRS is associated with a second number of antenna ports, and the second number is smaller than the first number.

9. A user equipment (UE) comprising:

a transceiver configured to:

transmit an indication for one of:

a first capability value to receive physical downlink control channels (PDCCHs) over symbols only when at least one of the symbols does not include resource elements (REs) for a common reference signal (CRS), and a second capability value to receive PDCCHs over symbols when any of the symbols include the REs for the CRS, wherein:

a PDCCH is according to a new radio (NR) radio access technology (RAT), and the CRS is according to a long term evolution (LTE) RAT; and receive first information for parameters of the CRS; and a processor operably coupled to the transceiver, the processor configured to determine, based on the parameters of the CRS, the REs for the CRS in symbols of the PDCCH, wherein the transceiver is further configured to receive the PDCCH based on the REs for the CRS in symbols of the PDCCH.

10. The UE of claim 9, wherein:

the PDCCH provides a downlink control information (DCI) format, the indication is for the second capability value, and the reception of the PDCCH comprises:

channel estimation based on reception for a demodulation reference signal (DM-RS) only in REs of the PDCCH that:

provide the DM-RS, and are in symbols of the PDCCH that do not include the REs for the CRS, and reception of the DCI format in all REs of the PDCCH that provide the DCI format excluding the REs for the CRS.

11. The UE of claim 9, wherein:

the PDCCH provides a downlink control information (DCI) format, the indication is for the first capability value, and the reception of the PDCCH comprises:

channel estimation based on reception for a demodulation reference signal (DM-RS) in all REs of the PDCCH that provide the DM-RS, and reception of the DCI format in all REs of the PDCCH that provide the DCI format excluding the REs for the CRS.

12. The UE of claim 9, wherein the PDCCH reception: is in a slot, and does not include a first symbol of the slot.

13. The UE of claim 9, wherein the transceiver is further configured to receive second information indicating reception for a demodulation reference signal (DM-RS) in the REs for the CRS, wherein the DM-RS is associated with the PDCCH.

14. The UE of claim 9, wherein the transceiver is further configured to receive second information indicating REs, from the REs for the CRS, without presence of the CRS.

15. The UE of claim 9, wherein the transceiver is further configured to receive second information indicating REs, from the REs for the CRS, without presence of a demodulation reference signal (DM-RS) associated with the PDCCH.

16. The UE of claim 9, wherein:

the transceiver is further configured to receive second information for parameters of a second CRS, the CRS is associated with a first number of antenna ports, the second CRS is associated with a second number of antenna ports, and the second number is smaller than the first number.

17. A base station comprising:

a transceiver configured to receive, from a first user equipment (UE), an indication for one of:

a first capability value to receive physical downlink control channels (PDCCHs) over symbols only when at least one of the symbols does not include resource elements (REs) for a common reference signal (CRS), and a second capability value to receive PDCCHs over symbols when any of the symbols include the REs for the CRS, wherein a PDCCH is according to a new radio (NR) radio access technology (RAT); and a processor operably coupled to the transceiver, the processor configured to determine a first number of antenna ports for the CRS, wherein the transceiver configured to transmit:

first information indicating the first number of antenna ports for the CRS to the first UE, and second information indicating a second number of antenna ports for the CRS to a second UE, and wherein:

the first number is larger than the second number, and the CRS is according to a long term evolution (LTE) RAT.

18. The base station of claim 17, wherein the transceiver is further configured to transmit:

a first PDCCH to the first UE, and a second PDCCH to the second UE, wherein both the first and second PDCCH transmissions exclude REs associated with the first number of antenna ports for the CRS.

19. The base station of claim 17, wherein the transceiver is further configured to transmit third information indicating transmission for a demodulation reference signal (DM-RS) of a PDCCH in REs associated with the first number of antenna ports for the CRS.

20. The base station of claim 17, wherein the transceiver is further configured to transmit third information indicating REs that:

are associated with the first number of antenna ports for the CRS, and are without presence of the CRS.

* * * * *